United States Patent [19]
Thompson

[11] Patent Number: 5,315,838
[45] Date of Patent: May 31, 1994

[54] AIR CONDITIONER FILTER MONITOR

[75] Inventor: Christopher M. Thompson, Nashville, Tenn.

[73] Assignee: Whirlpool Corporation, Benton Harbor, Mich.

[21] Appl. No.: 106,683

[22] Filed: Aug. 16, 1993

[51] Int. Cl.⁵ ............................................. F25B 49/00
[52] U.S. Cl. ........................................ 62/129; 55/274; 116/272; 116/DIG. 25
[58] Field of Search ............. 55/274; 62/125, 129, 62/262; 116/272, DIG. 25

[56] References Cited

U.S. PATENT DOCUMENTS

| | | | |
|---|---|---|---|
| 2,700,362 | 1/1955 | Calling | 116/117 |
| 3,201,772 | 8/1965 | Ladusaw | 340/239 |
| 3,263,403 | 8/1966 | Ladusaw | 55/274 |
| 3,635,001 | 1/1972 | Komroff et al. | 55/274 |
| 4,020,525 | 5/1977 | Fromknecht et al. | 15/339 |
| 4,416,033 | 11/1983 | Specht | 15/339 |
| 4,445,456 | 5/1984 | Nelson | 55/274 X |
| 4,688,511 | 8/1987 | Gerlach et al. | 55/274 X |
| 4,747,364 | 5/1988 | Horowitz | 116/268 |
| 5,046,406 | 9/1991 | Harris et al. | 98/40.24 |

*Primary Examiner*—William E. Tapolcai
*Attorney, Agent, or Firm*—Thomas J. Roth; Stephen D. Krefman; Thomas E. Turcotte

[57] ABSTRACT

A filter monitor for indicating the condition of an air filter in a room air conditioner to determine whether the filter is clogged. The filter monitor assembly includes a shell mounted on the front of the air conditioner, with an air pressure equalization passage permitting air flow through the shell when a clogged air filter creates a negative air pressure inside the air conditioner housing. A signal flag within the shell is normally retracted by the force of gravity, but is visibly extended outside the shell by the pressure-induced air flow through the shell, indicating that the air filter is clogged.

23 Claims, 3 Drawing Sheets

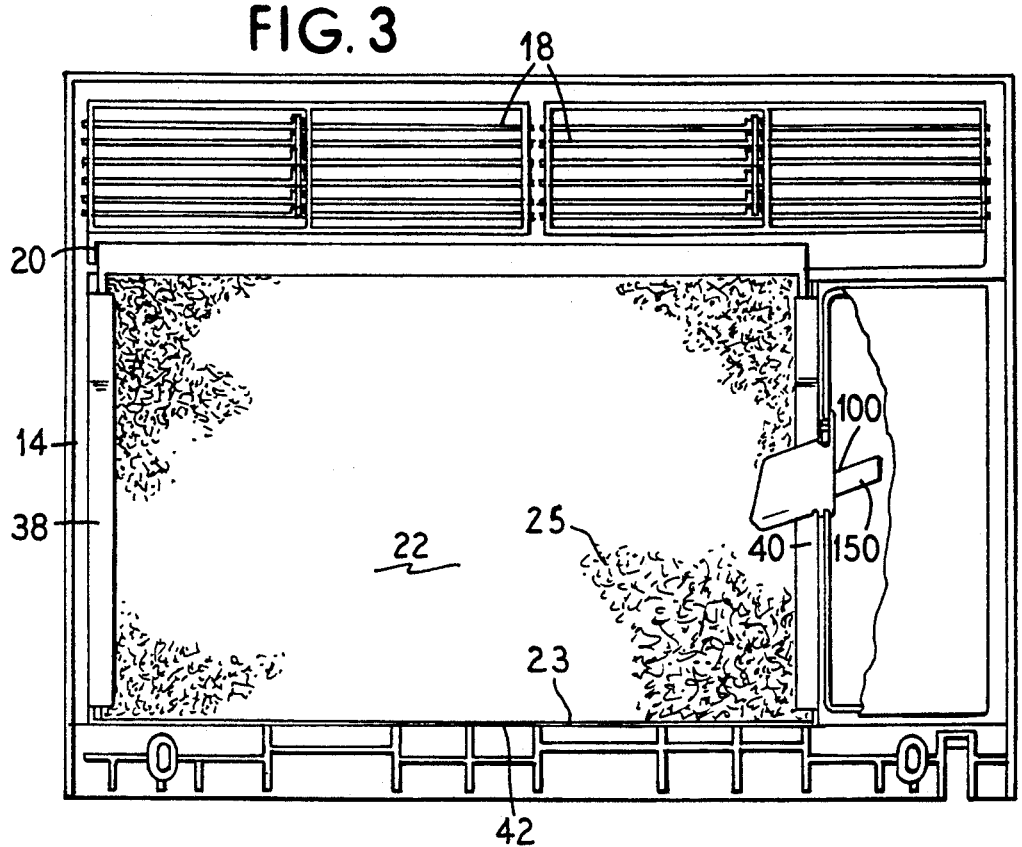
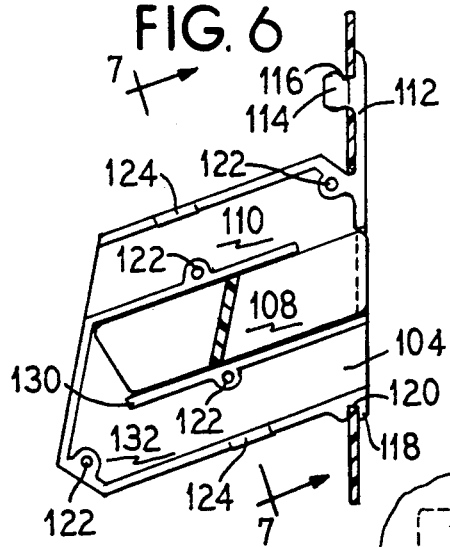
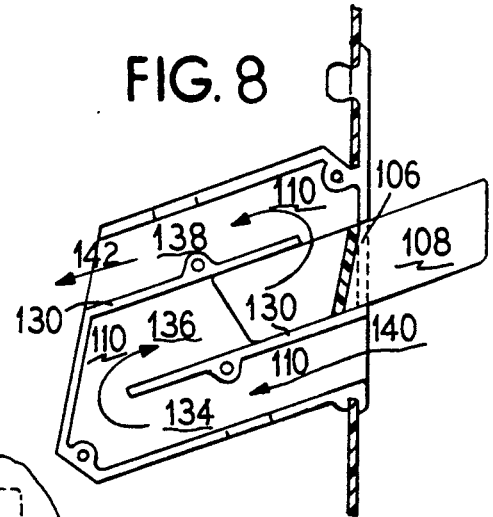
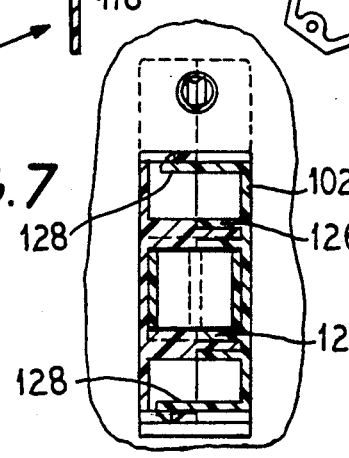
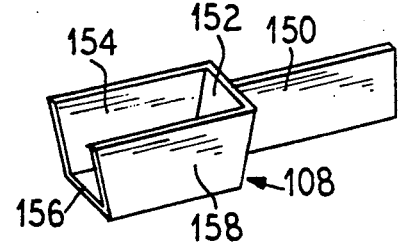

AIR CONDITIONER FILTER MONITOR

TECHNICAL FIELD

The technical field of the invention is an air filter monitor for window-mounted air conditioning equipment. The filter monitor responds to the air pressure differential between the interior and exterior of the air conditioner to signal that the filter is clogged and requires cleaning or replacement. Furthermore, the filter monitor is incorporated into the housing of a window-mounted room air conditioner.

BACKGROUND OF THE INVENTION

Window-mounted domestic room air conditioners provide an effective and economical means for cooling the air in a limited living space. These units are a popular alternative to central air conditioning systems, which cool the entire household by circulating the conditioned air through the house central air duct system. The central air duct system often includes some form of air filtration system to remove airborne particulate matter from the recirculated air stream. Air filtration is desirable to provide a cleaner and healthier living environment in the house.

For these same reasons, it is desirable to provide air filtration means on window-mounted air conditioners. A filter may be located inside a window-mounted air conditioner housing directly behind the air inlet duct, so that air which is drawn into the air inlet by the air conditioner internal fan first passes through the filter element, and then passes through the heat exchange coil to be cooled before exiting to the room environment.

It is important that the air filter is changed or cleaned on a regular basis because after a period of time the filter will become partially clogged with trapped particles. When the filter becomes clogged, it reduces the flow of air into the unit, thereby reducing the effectiveness of the air conditioner. It is therefore desirable to provide some method of signalling that the filter is clogged and requires changing.

In the past, this problem has been addressed in a variety of ways. U.S. Pat. No. 3,263,403 discloses an air conditioner filter condition indicator that has a float inside a transparent tube on the front of the housing, such that when the filter is clogged the float is visible through a cutout window in the control knob to indicate that the filter requires changing. U.S. Pat. No. 3,201,772 discloses an air conditioner in which the increased air pressure against the clogged filter causes the filter element to drop onto a mechanical lever which causes a visual signal to be displayed in a window on the air conditioner housing.

Among the drawbacks of these prior systems are decreased visual aesthetics, since the indicator window or tube is always visible. Also of concern are the cost of the parts of the prior systems, the number of parts involved in such systems, the amount of modification required to the air conditioner housing to install a particular system, and the manufacturability of units incorporating such systems.

SUMMARY OF THE INVENTION

The present invention is an improved filter monitor for a window-mounted room air conditioner. It is inexpensive both in terms of parts and the cost of manufacture, it involves only minimal modification to the air conditioner housing, and it does not interfere with the visual aesthetics of the air conditioner housing design.

The present filter monitor consists of a plastic shell that is mounted in the control compartment on the front of the air conditioner housing. The shell has a serpentine internal air passage, which, on one end is in communication with the interior of the air conditioner housing behind the filter element. The other end of the passage is in communication with the room environment. A sloped track is formed in a central portion of the passage to receive a sliding signal flag, which consists of a signal portion and an air resistance portion. An aperture is provided on the exterior surface of the shell to permit the signal portion of the flag to visibly extend from the air conditioner housing inside the control compartment. The track is oriented at a downwardly sloping angle from the exterior to the interior of the air conditioner, so that the force of gravity causes the signal flag to normally rest on the lower interior end of the track, with the signal portion of the flag retracted inside the air conditioner housing.

When the air filter element becomes clogged, the air flow through the filter will be reduced, and the air conditioner fan will create a negative air pressure in the interior of the air conditioner housing behind the air filter, as compared to the ambient room air pressure. This pressure differential causes relatively high pressure air from the outside of the air conditioner to flow through the serpentine passage in the indicator shell to the interior of the air conditioner. The force of the air flow against the air resistance portion of the signal flag is sufficient to overcome the force of gravity, and causes the flag to slide up to the exterior end of the track so that the signal portion of the flag is visibly extended from the air conditioner housing. When the air conditioner is turned off or the filter is changed, the air pressure differential will cease and the signal flag will be retracted into the air conditioner housing by the force of gravity.

BRIEF DESCRIPTION OF THE DRAWING

The present invention is illustrated in the figures of the drawing as follows:

FIG. 3 is an elevation view of the back side of the air conditioner front panel with a filter element and filter monitor installed;

FIG. 6 is a sectional view through the air filter monitor shell along line 6—6 of FIG. 5, illustrating the signal flag in a retracted position;

FIG. 7 is a sectional view through the air filter monitor shell along line 7—7 of FIG. 6, illustrating the signal flag in a retracted position;

FIG. 8 is a sectional view through the air filter monitor shell along line 6—6 of FIG. 5, illustrating the signal flag in an extended position; and FIG. 9 is a perspective view of the signal flag of the air filter monitor.

DESCRIPTION OF THE PREFERRED EMBODIMENT

Figure 1:
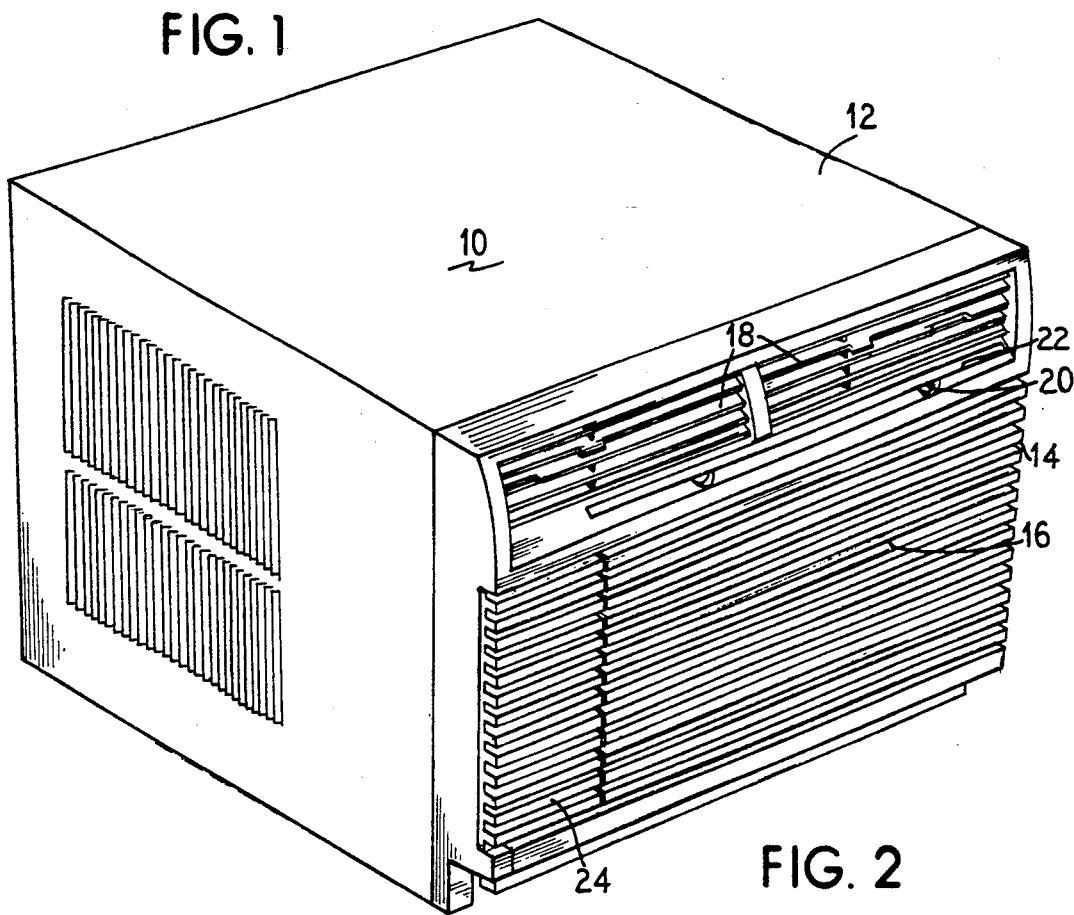
FIG. 1 is a perspective view of the assembled window-mounted air conditioner unit.
Figure 2:
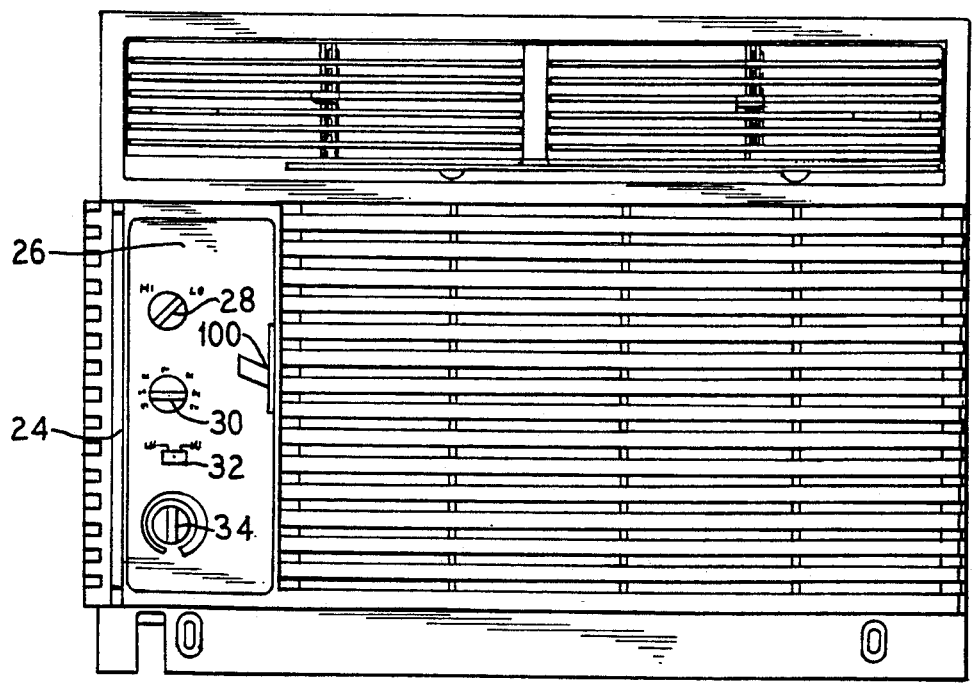
FIG. 2 is a front elevation view of the window-mounted air conditioner with the control compartment door in an open position.

The exterior of an assembled window air conditioner unit 10 is shown in FIG. 1. The air conditioner unit exterior generally consists of a cabinet 12 which covers the top and sides of the assembled unit, and a front panel 14. Front panel 14 further consists of air inlet louvers 16, air outlet louvers 18, a filter housing opening 20, air filter 22, and a control panel door 24. FIG. 2 shows the front panel 14 with control panel door 24 in an open position, exposing control panel 26, operating controls 28, 30, 32 and 34, and a portion of a filter monitor assembly 100.

Figure 4:
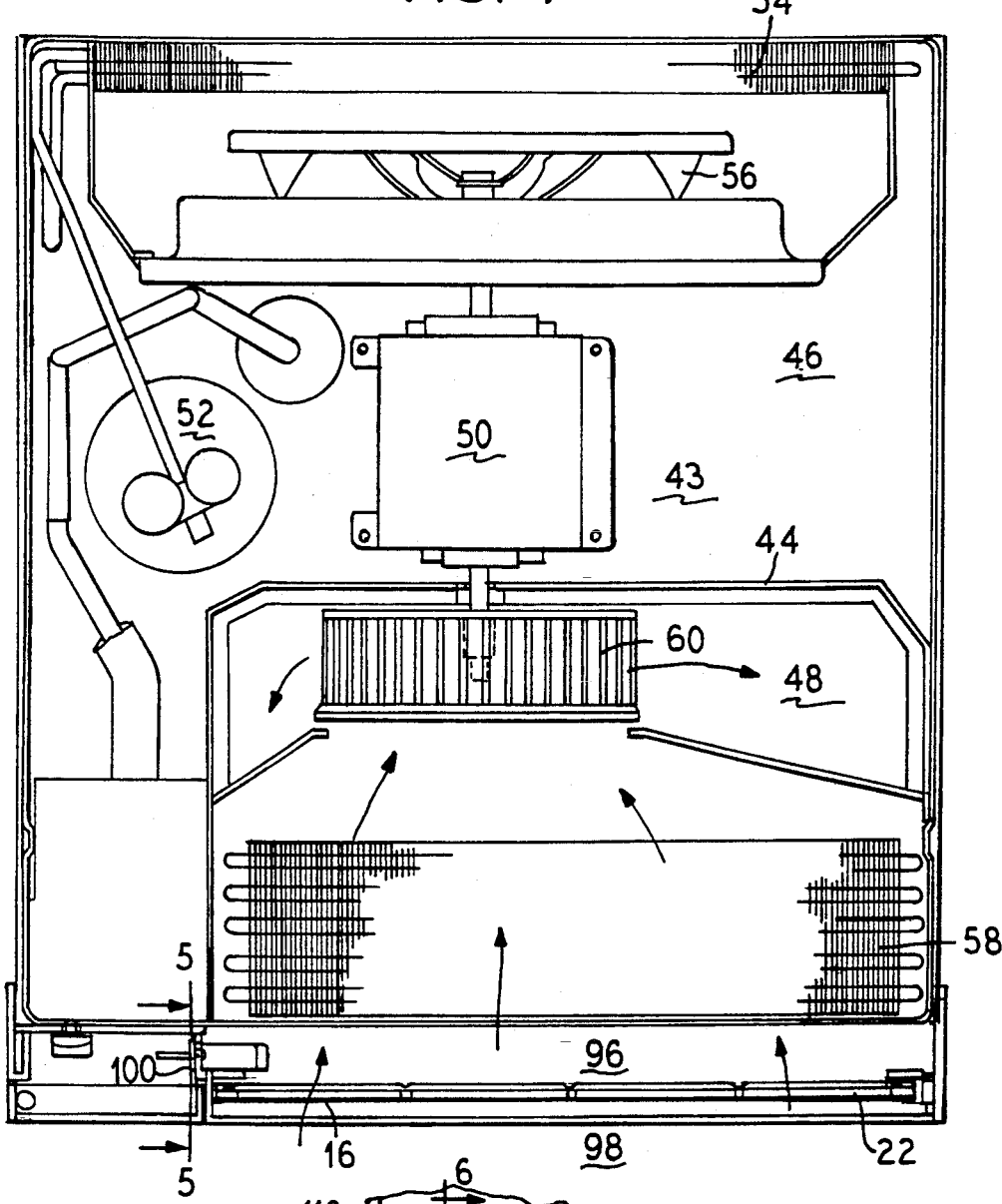
FIG. 4 is a top view of the air conditioner with the exterior housing removed.

FIG. 4 shows the various internal components of the air conditioner unit, all mounted on a base 43. Divider wall 44 separates the interior of the air conditioner into an outdoor side 46 which is in communication with ambient temperature outdoor air, and an indoor side 48 which is in communication with cooled indoor air. The operative components of the air conditioner include a motor 50 which simultaneously drives condenser fan 56 and evaporator fan 60. A compressor 52 circulates refrigerant in a loop through the evaporator coil 58 and the condenser coil 54.

During operation of the air conditioner, evaporator fan 60 draws indoor air from a room past inlet louvers 16 and through evaporator coil 58. The refrigerant pumped by compressor 52 through evaporator 58 absorbs heat from the indoor air, resulting in a reduction of temperature in the indoor airstream. The cooled air is then circulated back into the room through outlet louvers 18. The refrigerant continues to flow to the condenser coil 54, and outdoor air is blown over the condenser coil 54 by condenser fan 56 to expel the absorbed heat to the outdoor atmosphere.

Filter 22 is provided in the indoor air circulation path to remove airborne particles from the circulated indoor air. The filter housing opening 20 permits the air filter 22 to be installed in its operative position, generally between air inlet louvers 16 and evaporator coil 58, as shown in FIG. 4. Referring to FIG. 3, the filter 22 is held in its operative position between first and second side edge support rails 38 and 40, respectively, and bottom edge support 42.

The filter 22 consists of a rigid outer frame 23, and a sheet of air-permeable filter medium 25 inside the frame 23. The filter medium 25 consists of an arrangement of closely spaced fibers, between which air can normally pass relatively unimpeded. The fibers are close enough together to prevent the passage of airborne particles, so that such particles are removed from the indoor air and trapped in the filter medium 25.

After a period of time, the accumulation of trapped particles in the filter medium causes the filter 22 to become clogged, restricting the air flow through the evaporator coil 58 and resulting in less efficient cooling of the indoor air. When such a blockage condition occurs, evaporator fan 60 continues to attempt to draw indoor air through the filter 22, but since air flow is restricted, a negative air pressure is created on the interior side 96 of the filter 22 with respect to the room ambient air pressure on the exterior side 98 of the filter. The filter monitor assembly 100 operates in response to this air pressure differential to provide a visual indication that the filter is clogged and requires changing.

Figure 5:
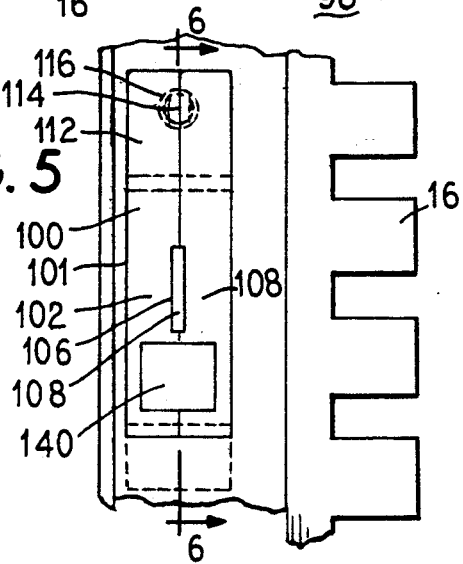
FIG. 5 is a fragmentary elevation view of the exterior of the air filter monitor from the air conditioner control compartment, along line 5—5 of FIG. 4.

FIG. 5 shows the exterior appearance of the filter monitor assembly 100. The assembly is made of three parts, including first and second shell halves 102 and 104, respectively, and the indicator flag 108. Further reference to FIGS. 6 and 7 illustrates the construction and mounting technique of the filter monitor assembly 100.

The two shell halves 102 and 104 are molded plastic parts, and are generally mirror images of one another, with the exception of certain assembly and mounting components. Each shell half includes a planar wall portion 132 which forms one exterior side wall of the indicator assembly, and a series of wall portions 130 which, upon assembly of the shell halves, form the exterior and interior end walls, the top and bottom walls, and interior walls defining a continuous serpentine passage 110 between the planar wall portions 132 of the two shell halves.

Shell half 104 has a series of alignment pins 122 which are received in alignment holes 126 on shell half 102 to ensure proper orientation of the two halves with respect to one another. Shell half 102 has a pair of resilient locking tabs 128 which are received in tab slots 124 on shell half 104 to securely fasten the two halves together.

A number of mounting features are provided for fastening the monitor assembly 100 to a rectangular aperture 101 formed in the control area of the air conditioner front panel. The monitor assembly 100 is inserted from the exterior of the air conditioner into the mounting aperture 101 so that a slot 118 formed across the bottom of the monitor assembly receives the bottom edge 120 of the mounting aperture 101, thus securing the bottom portion of the monitor assembly to the air conditioner front panel. A mounting flange 112 is formed on the upper portion of the monitor assembly, upon which a resilient mounting stud 114 is located. The mounting stud 114 locks into mounting hole 116 located above the rectangular mounting aperture 101, securing the upper portion of the monitor assembly, and completing the mounting of the monitor assembly to the air conditioner unit.

This simple mounting technique permits efficient manufacture of the air conditioner appliance. Furthermore, the only modification required for installation of the filter condition monitor is the small rectangular aperture 101 formed in the air conditioner housing. No major redesign or rearrangement of internal components is required for use of the monitor.

FIG. 8 shows the arrangement of the serpentine air passage 110 inside the monitor assembly. Ribs 130 divide the interior of the monitor assembly into three parallel interconnected passage portions 134, 136, and 138. Passage portion 134 is the lowermost passage portion, and terminates at one end at the exterior passage opening 140 which is in communication with the exterior room ambient air pressure. Passage portion 138 is the uppermost passage portion and terminates at one end at the interior passage opening 142, which is in communication with the interior air pressure of the air conditioner cabinet immediately behind the filter 22. Passage portion 136 is the middle passage portion, and connects with the lower and upper passage portions 134 and 138. A slot 106 is disposed on the exterior surface of the monitor shell assembly at the end of passage portion 136 to permit a portion of the indicator flag 108 to extend therethrough, as will be described in more detail below. The passage portions have a rectangular cross section shape, although other configurations are possible.

Passage portion 136 serves as a track for sliding indicator flag 108, which is shown in perspective in FIG. 9. The indicator flag includes a signalling portion 150, an air pressure reaction portion 152, and perpendicular walls 154, 156, and 158. The walls 154, 156, and 158 serve the combined function of aligning the indicator flag inside the track so that it slides freely, and also forms a partially closed box to enhance the force of air flow through the passage against the air pressure reaction portion 152. One end of passage portion 136 has a slot 106 through which the signalling portion 150 of the indicator flag 108 may protrude.

As shown in FIG. 6, all three parallel portions 134, 136, and 138 of the serpentine air passage slope downward from the exterior portion of the indicator assembly to the interior of the air conditioner. The indicator flag 108 which slides freely in center passage portion 136 is therefore naturally biased by the force of gravity to the lower interior end of passage 136 as shown in FIG. 6, with no portion of signalling portion 150 extending outside the monitor assembly.

As previously described, operation of the air conditioner with a clogged or partially clogged filter creates a negative air pressure in the interior of the air conditioner housing behind the air filter. FIG. 8 illustrates the operation of the air filter monitor in response to this air pressure differential. Relatively high pressure room ambient air will travel through the air pressure equalization passage 110. The reaction portion 152 of the retracted indicator flag 108 will initially block air flow through the passage, but as the magnitude of the air pressure differential increases, the force of the air in the passage portion 136 will create sufficient force against reaction portion 152 to push the indicator flag up the inclined passage against the force of gravity. The signalling portion 150 of the indicator flag 108 will then be visibly extended through slot 106, as shown in FIGS. 2, 3, 4, and 8 indicating that the air filter requires changing.

Once the air filter is changed, the air pressure differential will cease to exist, and the force of gravity will cause the indicator flag to slide back down to the lower end of passage portion 136 as shown in FIG. 6, and the flag 108 will no longer be visible.

Experimentation with the presently disclosed filter monitor has determined that the desirable angle of the sloping indicator flag track 136 from the exterior to the interior side of the filter monitor is approximately 18 degrees below horizontal, with an acceptable range of operation between 15 and 21 degrees. This angle permits adequate gravitational force to overcome the frictional force between the indicator flag and the track to consistently bias the indicator flag into the retracted position, and yet does not necessitate prohibitively high air pressure force to overcome the force of gravity and friction to slide the indicator flag to the extended position.

Because there is approximately 3 degrees of tolerance on either side of the desirable angle, the operability of the filter monitor is not severely affected by slight variations in air flow among various units of the same model of air conditioners, or by the possible variations in the positioning of the air conditioner during installation. Adaptation of the filter monitor to different models of air conditioners may require some modification of the slope angle of the track to compensate for the different air flow volume or installation position.

As is apparent from the foregoing disclosure, the invention is susceptible to being embodied with various alterations and modifications which may differ particularly from those included in the preceding description. It should be understood that I wish to embody within the scope of the patent warranted hereon all such modifications as reasonably and properly come within the scope of this contribution to the art.

What is claimed is:

1. A clogged air filter indicator for use in an air handling system in a room air conditioner in which a clogged air filter results in a negative air pressure differential between the air pressure inside said air handling system and the air pressure outside the air handling system, said indicator comprising:

a closed shell, the exterior of said shell comprising:
an exterior wall disposed outside of said air handling system, said exterior wall having a first air aperture therethrough for communication between the interior of said shell and the outside of said air handling system, and an indicator aperture;
an interior wall disposed inside said air handling system, said interior wall having a second air aperture therethrough for communication between the interior of said shell and the inside of said air handling system;
a serpentine air pressure equalization passage formed on the interior of said shell, said passage having a plurality of serially arranged segments forming a continuous air flow path between said first air aperture and said second air aperture, such that an air pressure differential due to a clogged air filter induces air flow through said passage from said first air aperture to said second air aperture;
a track formed in one of said segments of said passage, said track having an exterior end adjacent to said indicator aperture in said exterior wall, and an interior end adjacent to said interior wall, said track oriented within said passage such that said pressure-induced air flow is in the direction from said interior end to said exterior end of said track; and
an indicator element located in said track, said indicator element being freely slideable between said interior end and said exterior end of said track, and said indicator element comprising:
an air reaction surface against which said pressure-induced air flow creates force sufficient to move said indicator element from said interior end to said exterior end of said track, and
a flag portion which is disposed inside said shell when said indicator element is at said interior end of said track, and which extends outside said shell when said indicator element is moved to said exterior end of said track by the force of said pressure-induced air flow, serving as a visual indication that said air filter is clogged.

2. An air filter indicator as claimed in claim 1 further comprising biasing means for biasing said indicator element towards said interior end of said track, wherein the force of said pressure-induced air flow against said air reaction surface of said indicator element is sufficient to overcome the force of said biasing means, thereby moving said indicator element to said exterior end of said track.

3. An air filter indicator as claimed in claim 1 wherein said track is sloped at a downward angle from said exterior end to said interior end thereof, such that said indicator element is biased toward said interior end by the force of gravity, wherein the force of said pressure-induced air flow against said air reaction surface of said indicator element is sufficient to overcome the force of gravity, thereby moving said indicator element to said exterior end of said track.

4. An air filter indicator as claimed in claim 1 combined with a room air conditioner, said air conditioner comprising a closed housing for containing a conditioned air flow, an inlet to said housing, an air filter inside said housing from said inlet, a heat exchange coil inside said housing for cooling the conditioned air flow, a fan inside said housing for drawing air through said inlet, said filter, and said coil, and an outlet for releasing said conditioned air flow to a room environment, wherein a clogged air filter results in a negative air pressure within said housing between said inlet and said fan, said clogged air filter indicator installed in said air conditioner such that said interior wall of said shell is located inside said housing between said inlet and said fan, and said exterior wall is located outside said housing.

5. An air filter condition indicator for use in an air handling system in a room air conditioner that includes a closed housing, an air inlet, an air filter, an air outlet, a fan for pulling air into said housing through said inlet and filter, and forcing air out of said housing through said outlet, wherein a clogged air filter creates a negative air pressure differential between the interior and the exterior of said air handling system, said air filter condition indicator operating in response to said air pressure differential to signal that said filter is clogged, said indicator comprising:
- a closed shell mounted in an aperture in said housing, said shell comprising a plurality of outer walls, including an exterior end wall disposed outside of said housing, and an interior end wall disposed inside said housing, and a first air aperture through said exterior end wall, a second air aperture through said interior end wall, and an indicator aperture through said exterior end wall;
- a serpentine air pressure equalization passage formed inside said shell and terminating at a first end at said first air aperture, and terminating at a second end at said second air aperture, with a portion of said passage formed as a track, said track portion having an interior end adjacent to said interior end wall, and an exterior end adjacent to said indicator aperture in said exterior end wall;
- an indicator element disposed in said track portion of said passage, said indicator element comprising an air reaction surface and a flag portion, said indicator element being freely slideable between a retracted position in which said air reaction surface is adjacent to said interior end of said track with said air reaction surface substantially blocking said air passage and said flag disposed entirely inside said shell, and an extended position in which said air reaction surface is adjacent to said exterior end of said track and said air passage is not blocked by said air reaction surface and said flag is extended through said indicator aperture outside of said shell; and
- wherein the occurrence of a negative air pressure differential due to a clogged air filter induces air flow through said air pressure equalization passage from said first air aperture to said second air aperture, creating sufficient force against said air reaction surface to slide said indicator element to said extended position.

6. An air filter condition indicator as claimed in claim 5, further comprising biasing means for normally biasing said indicator element to said retracted position, wherein the air pressure differential caused by a clogged filter creates air flow through said passage which exerts sufficient force against said air reaction surface to overcome said biasing means and slide said indicator element to said extended position.

7. An air filter condition indicator as claimed in claim 6, wherein said track is sloped downward at a predetermined angle from said exterior end to said interior end, such that said biasing means for normally biasing said indicator element to said retracted position is the force of gravity.

8. An air filter condition indicator as claimed in claim 7, wherein said predetermined angle is between 15 and 20 degrees.

9. An air filter condition indicator as claimed in claim 5 wherein the exterior of said shell comprises first and second spaced apart side walls, a top wall between the top edge of said side walls, a bottom wall between the bottom edge of said side walls, an exterior end wall between the edges of said sidewalls adjacent to the exterior of said air handling system, and an interior end wall between the edges of said sidewalls disposed inside said air handling system.

10. An air filter condition indicator as claimed in claim 9 wherein the interior of said shell comprises a serpentine air pressure equalization passage formed by the combination of:
- a lower internal wall extending between said first and second side walls and said exterior end wall;
- an upper internal wall extending between said first and second side walls and said interior end wall; and wherein
- said first air aperture is disposed in said exterior end wall between said bottom wall and said lower internal wall, and
- said second air aperture is disposed in said interior end wall between said top wall and upper internal wall.

11. An air filter condition indicator as claimed in claim 10 wherein said track portion of said air pressure equalization passage is the space inside said shell bounded between the respective pairs of said upper and lower internal walls, said first and second side walls, and said exterior and interior end walls.

12. An air filter condition indicator as claimed in claim 10, wherein said upper and lower internal walls are mutually parallel, and are oriented at a downward sloping angle from the direction of said exterior end wall to said interior end wall.

13. An air filter condition indicator as claimed in claim 5 wherein said shell is comprised of an assembly of first and second shell halves, wherein
- said first shell half comprises a plurality of alignment pins, and a plurality of resilient locking tabs, and
- said second shell half comprises a plurality of alignment holes, and a plurality of locking slots, and
- wherein said shell first and second shell halves are assembled by inserting said alignment pins into said alignment holes, and locking said locking tabs into said locking slots.

14. An air filter condition indicator as claimed in claim 5 wherein said mounting aperture in said air handling system housing comprises a lower edge, and an upper edge, and first and second side edges, and a locking hole is provided in said housing above said upper edge;

and said shell has formed thereon a mounting slot on a bottom surface of said shell, and a locking pin formed on said exterior end wall of said shell, wherein said shell is mounted on said housing by placing said mounting slot over said lower edge of said mounting aperture, and pivoting said shell into said housing interior until said locking pin engages said locking hole.

15. An air filter condition indicator as claimed in claim 13 wherein said indicator element comprises:

an air reaction portion comprising an air resistance wall which substantially blocks said air passage when said indicator element is in said retracted position, and a plurality of guide walls extending from said air resistance wall, wherein each of said guide walls is oriented parallel to one of said boundary walls of said passage, and the combination of said guide walls and said air resistance wall form a partially closed air reaction box within said passage; and a flag portion comprising an elongated blade attached to said air resistance wall such that when said indicator element is in said extended position, the majority of said flag portion extends outside of said shell through said indicator aperture.

16. A filter condition indicator for a room air conditioner that includes an air conditioner housing, an air inlet on the front of said housing, an air filter inside said housing from said inlet, a heat exchange coil for removing heat from said inlet air, an air outlet on the front of said housing, and a fan for pulling air into said housing through said inlet, said filter, and said heat exchange coil, and expelling cooled air out of said housing through said outlet, wherein a clogged air filter creates a negative air pressure differential between the interior of said air conditioner housing and the room ambient air pressure, said indicator operating in response to said air pressure differential to signal that said air filter is clogged, said indicator comprising:

a closed shell mounted in an aperture in said housing, said shell comprising a plurality of outer walls, including an exterior end wall disposed outside of said housing, and an interior end wall disposed in said housing interior between said filter and said fan, and a first air aperture through said exterior end wall in communication with the ambient room air pressure, a second air aperture through said interior end wall in communication with the internal housing air pressure between said filter and said fan, and an indicator aperture through said exterior end wall;

a serpentine air pressure equalization passage formed inside said shell and terminating at a first end at said first air aperture, and terminating at a second end at said second air aperture, with a portion of said passage formed as a track, said track portion having an interior end adjacent to said interior end wall, and an exterior end adjacent to said indicator aperture in said exterior end wall;

an indicator element disposed in said track portion of said passage, said indicator element comprising an air reaction surface and a flag portion, said indicator element being freely slideable between a retracted position in which said air reaction surface is adjacent to said interior end of said track with said air reaction surface substantially blocking said air passage and said flag disposed entirely inside said shell, and an extended position in which said air reaction surface is adjacent to said exterior end of said track and said air passage is not blocked by said air reaction surface and said flag is extended through said indicator aperture outside of said shell so that said flag is visible from the front of said air conditioner housing; and wherein the occurrence of a negative air pressure differential due to a clogged air filter induces air flow through said air pressure equalization passage from said first air aperture to said second air aperture, creating sufficient force against said air reaction surface to slide said indicator element to said extended position.

17. A filter condition indicator as claimed in claim 16, further comprising biasing means for normally biasing said indicator element to said retracted position, wherein the air pressure differential caused by a clogged filter creates air flow through said passage which exerts sufficient force against said air reaction surface to overcome said biasing means and slide said indicator element to said extended position.

18. A filter condition indicator as claimed in claim 17, wherein said track is sloped downward at a predetermined angle from said exterior end to said interior end, such that said biasing means for normally biasing said indicator element to said retracted position is the force of gravity.

19. A filter condition indicator as claimed in claim 18, wherein said predetermined angle is between 15 and 20 degrees.

20. A filter condition indicator as claimed in claim 16 wherein:

the exterior of said shell comprises first and second spaced apart side walls, a top wall between the top edge of said side walls, a bottom wall between the bottom edge of said side walls, an exterior end wall between the edges of said sidewalls adjacent to the exterior of said air handling system, and an interior end wall between the edges of said sidewalls disposed inside said air handling system; and the interior of said shell comprises a serpentine air pressure equalization passage formed by the combination of:

a lower internal wall extending between said first and second side walls and said exterior end wall;

an upper internal wall extending between said first and second side walls and said interior end wall; wherein said first air aperture is disposed in said exterior end wall between said bottom wall and said lower internal wall; and said second air aperture is disposed in said interior end wall between said top wall and upper internal wall.

21. A filter condition indicator as claimed in claim 20, wherein said track portion of said air pressure equalization passage is the space inside said shell bounded between the respective pairs of said upper and lower internal walls, said first and second side walls, and said exterior and interior end walls.

22. A filter condition indicator as claimed in claim 21, wherein said upper and lower internal walls are mutually parallel, and are oriented at a downward sloping angle from the direction of said exterior end wall to said interior end wall.

23. A filter condition indicator as claimed in claim 16, wherein said air conditioner housing includes a control compartment on a front portion thereof, said control compartment being closable by a door, wherein said mounting aperture for said filter condition indicator is located inside said control compartment.

* * * * *